(12) United States Patent
Bakeev et al.

(10) Patent No.: US 7,531,591 B2
(45) Date of Patent: May 12, 2009

(54) AQUEOUS DISPERSION OF POLY(ACETAL-POLYETHER) AND ITS USE IN PROTECTIVE COATINGS

(75) Inventors: Kirill N. Bakeev, Newark, DE (US); James G. Binder, Woodstown, NJ (US); Theo Klootwijk, Papendrecht (NL); Dirk Kruythoff, Dordrecht (NL); Betty Maagdenberg-Roels, Ambacht (NL); Tuyen T. Nguyen, Newark, DE (US); Jeffrey K. Politis, Arden, DE (US); Willimlen G. Salomons, Steenbergen (NL)

(73) Assignee: Hercules Incorporated, Wilmington, DE (US)

( * ) Notice: Subject to any disclaimer, the term of this patent is extended or adjusted under 35 U.S.C. 154(b) by 638 days.

(21) Appl. No.: 11/269,329

(22) Filed: Nov. 8, 2005

(65) Prior Publication Data

US 2006/0128846 A1 Jun. 15, 2006

Related U.S. Application Data

(60) Provisional application No. 60/634,500, filed on Dec. 9, 2004, provisional application No. 60/636,268, filed on Dec. 15, 2004.

(51) Int. Cl.
*C08K 5/06* (2006.01)

(52) U.S. Cl. ........................... 524/376; 524/377

(58) Field of Classification Search ................. 524/376, 524/377

See application file for complete search history.

(56) References Cited

U.S. PATENT DOCUMENTS

| | | | |
|---|---|---|---|
| 5,137,571 A | 8/1992 | Eisenhart et al. | 106/217 |
| 5,378,756 A | 1/1995 | Thies et al. | 524/591 |
| 5,425,806 A | 6/1995 | Doolan et al. | 106/203 |
| 5,574,127 A | 11/1996 | Sau | 528/125 |
| 5,959,013 A | 9/1999 | Conradi et al. | 524/378 |
| 6,063,857 A | 5/2000 | Greenblatt et al. | 524/561 |
| 6,150,445 A | 11/2000 | Bostrom et al. | 524/378 |
| 6,162,877 A | 12/2000 | Sau | 525/403 |
| 2003/0171459 A1 | 9/2003 | Sau | 524/58 |
| 2004/0229998 A1 | 11/2004 | Sau | 525/54.3 |
| 2005/0150418 A1 | 7/2005 | Bakeev et al. | 106/14.5 |

FOREIGN PATENT DOCUMENTS

EP 0682094 A 11/1995

*Primary Examiner*—Edward J Cain
(74) *Attorney, Agent, or Firm*—Robert O'Flynn O'Brien; Joanne Rossi (57) ABSTRACT

An aqueous dispersion includes an associative thickener based on a hydrophobically modified poly(acetal- or ketal-polyether) (HM-PAPE) and at least one viscosity reducing agent selected from ethoxylated alcohols, ethoxylated acetyleneic diols, phosphate esters, dialkyl sulfosuccinates, and mixtures thereof. This aqueous dispersion improves the incorporation of the HM-PAPEs into aqueous based protective coatings. This dispersion also improves water-borne coating compositions that optionally contain latex.

49 Claims, 3 Drawing Sheets

AQUEOUS DISPERSION OF POLY(ACETAL-POLYETHER) AND ITS USE IN PROTECTIVE COATINGS

This application claims the benefit of U.S. Provisional Application Ser. No. 60/634,500, filed Dec. 9, 2004 and U.S. Provisional Application Ser. No. 60/636,268, filed Dec. 15, 2004.

FIELD OF THE INVENTION

This invention is related to an aqueous dispersion of an associative thickener and at least one surfactant. More particularly, this invention relates to an aqueous dispersion of an associative thickener based on poly(acetal- or ketal-polyether) (PAPE) and at least one surfactant selected from alcohol ethoxylates, ethoxylated acetylenic diols, phosphate esters and dialkyl sulfosuccinates. This invention further relates to the use of these aqueous dispersions in water-borne coating compositions.

BACKGROUND OF THE INVENTION

Associative thickeners are generally water-soluble or water-dispersible polymers bearing a small amount of hydrophobic groups. They are widely used to control rheology and application properties of a wide variety of aqueous systems. One major application area for associative thickeners is in water-borne coatings. It is well known that associative thickeners that are used as rheology modifiers in water-borne coatings, are difficult to prepare in the form of highly concentrated aqueous solutions with such a low viscosity so as to allow ease of pouring, pumping and dosing into aqueous systems such as water-borne protective coatings. Mechanism by which associative thickeners may thicken aqueous phase may involve hydrophobic associations between the hydrophobic groups in the thickener molecules and/or interaction of the associative thickeners with hydrophobic components present in the water-borne coatings compositions. The various types of associative thickeners are based on modified-natural polymers, such as cellulose ethers that have been hydrophobically-modified, synthetic polymers, such as hydrophobically-modified ethoxylated polyurethanes (HEURs), hydrophobically-modified alkali-soluble emulsions (HASEs) and hydrophobically-modified poly(acetal- or ketal-polyethers) (HM-PAPEs). The paint performance properties of water-borne coatings formulated with the associative thickeners vary in the most fundamental properties such as thickening efficiency, sag, leveling and film build (ICI viscosity).

Synthetic associative thickeners in recent years have gained an increased importance, particularly in controlling the rheology of water-borne coatings and latex paints. Since synthetic associative thickeners are prepared from basic chemicals, they can be prepared with certain properties in mind. In other words, from the ground up they can be tailored for the desired properties. Synthetic associative thickeners serve several roles in aqueous systems. In latex paints and water-borne coatings, for instance, the thickener provides improved stability and pigment suspension, and improved rheological and application properties. In personal care products, the thickeners provide improved body, feel, smoothness and richness of the product, making the product aesthetically more pleasing. In other industries, the synthetic associative thickeners are used to improve other desired properties.

Control of polymer solution viscosity and possibility to incorporate polymers in solution at high percent of solids content with relatively low viscosity are important requirements from a manufacturing and application standpoint. These requirements allow balancing overall cost of product use and achieving the proper procedures for product incorporation into the application formulation. Examples of these synthetic associative thickeners that are used as rheology modifiers in water-borne coatings include hydrophobically modified ethoxylated urethane (HEUR), hydrophobically modified alkali-soluble emulsion (HASE), hydrophobically modified polyethylene glycol (HM-PEG) and hydrophobically modified poly(acetal- or ketal-polyether) (HM-PAPE).

Because of intermolecular association through their hydrophobes, aqueous solutions of associative thickeners exhibit high viscosities even at lower concentrations. To suppress the solution viscosity of various types of associative thickeners, viscosity suppressing aids, such as propylene glycol, butyl carbitol, cyclodextrins and surfactants are used (see U.S. Pat. No. 6,063,857; U.S. Pat. No. 5,137,571; U.S. Pat. No. 5,425,806; U.S. Pat. No. 6,150,445; U.S. Pat. No. 5,378,756; U.S. Pat. No. 5,959,013; U.S. Pat. No. 5,574,127; U.S. Pat. No. 6,162,877). Typical useful viscosity ranges for these aqueous combinations of thickener and additive are about 1000 cps to 5000 cps. Typical desired polymer solid concentrations are in the range of about 15 to 30% by weight.

The HM-PAPE, manufactured and marketed by Hercules Incorporated under the trademark Aquaflow® are currently sold to customers in liquid form. Currently some of these products are sold as 25% active polymer solutions in a mixture of water and butyl carbitol.

The existing Aquaflow products are moderate to difficult to incorporate in a high gloss paint mix, having a styrene-acrylic binder. This problem also applies to solvent-free water-borne coatings with a pigment volume concentration (PVC) of 70% and containing a vinyl acetate/ethylene (VAc/E) latex.

From customer surveys, it was found that most latex paint manufacturers encountered difficulties while incorporating synthetic associative thickeners into a paint formula. Ideally, after the thickener is added to the base paint, the resulting paint mixture should be easy to stir and the thickener should manifest its thickening capacity very quickly, preferably within several minutes. In this way, the full viscosity of the paint is achieved fairly quickly and no further increase in viscosity occurs on storage.

The ease of incorporating thickener in latex paints is measured by recording the time the thickener starts to effectively thicken the paint formulation and by the time no further change in viscosity is observed. After incorporating the thickener into the base paint, the appearance of the paint should be smooth, meaning there should be no lumps left behind. The viscosity of the resulting paint is then measured. In the paint industry, this viscosity is referred to as Stormer viscosity and measured in Krebs unit (KU).

Since associative thickeners contain hydrophobic groups, they have the capacity of forming intermolecular association through their hydrophobes. They can also adsorb onto the hydrophobic surfaces of dispersed particles, such as latex and pigments. As a result, the associative thickeners have a much greater thickening effect than the corresponding polymer having the same molecular weight with no hydrophobic groups. One method of solving the problem of high viscosity is known in the art. This involves dissolving the associating thickener in water and then adding the solution to the aqueous formulation. However, this approach restricts the amount of polymer that could be dissolved in a given amount of water without encountering very high viscosity. Another approach to prevent high viscosity buildup is to make a dispersion of the associative thickener normally with an organic solvent. However, this approach should be avoided since organic solvents are volatile and many of them can cause environmental damage. Yet another approach to reduce viscosity of aqueous solutions of associative thickeners is to add nonionic surfactants to aqueous solutions of associative thickeners.

Several patents are known that disclose the making of pourable aqueous solutions or dispersions of associative thickeners using surfactants. U.S. Pat. No. 5,425,806 describes an aqueous dispersion of an associative thickener with reduced volatile organic compound (VOC) that is pourable at 25° C. The dispersion includes 15-40 weight percent of an associative thickener (i.e., polyurethanes, polyesters, modified cellulosics, polyester urethanes, polyether alpha-olefins, and polyether polyols), 30-85 weight percent of water, and 1-30 weight percent of one or more anionic or nonionic surfactants. U.S. Pat. No. 5,378,756 discloses a thickener composition of a polyurethane polymer, a nonionic emulsifier and a compound that contains an acetylenic group (a triple bond) in the middle. U.S. Pat. No. 6,150,445 discloses an aqueous concentrate of 10-50 weight percent of a polyurethane associative thickener and 1-25 percent of a nonionic surfactant containing ethyleneoxy and propyleneoxy groups. U.S. Pat. No. 6,063,857 discloses a composition of water, at least 5.0 weight percent of a neutralized hydrophobically modified alkali-soluble emulsion polymer and less than 0.5 weight percent of a surfactant. None of these prior art discloses the present invention.

BRIEF SUMMARY OF THE INVENTION

The present invention is directed to an aqueous dispersion of a hydrophobically modified poly(acetal- or ketal-polyether) (HM-PAPE) water, and a viscosity reducing agent of at least one surfactant of alcohol ethoxylates having a $C_{9-12}$ alcohol component, an ethoxylated acetylenic diol surfactant, phosphate ester surfactant, a combination of alcohol ethoxylated with anionic dialkyl sulfosuccinate surfactant or a combination of alcohol ethoxylated with anionic phosphate ester surfactant.

This invention also relates to an aqueous protective coating containing the above referenced dispersion and optionally a latex.

This invention further comprehends an improved method of incorporating HM-PAPE thickener into a protective coating formulation wherein dissolution time of HM-PAPE is significantly reduced as compared to the dissolution time of HM-PAPE delivered as high solids solutions made using water alone or in conjunction with an organic solvent, such as butyl carbitol.

DETAILED DESCRIPTION OF THE INVENTION

It has now been discovered that hydrophobically modified poly(acetal- or ketal-polyethers) (HM-PAPEs) can be effectively dispersed in water with as high as 40 wt %, preferably 30 wt %, solids concentration and yet have an acceptable low viscosity with the addition of as low as 0.5-3.0 wt % of nonionic and/or anionic viscosity reducing agent.

Associative Thickeners

The types of associative thickeners that are within the scope of this invention are based on poly(acetal- or ketal-polyether (PAPE) backbone. The thickener types include hydrophobically end-capped poly(acetal-ketal-polyether) and hydrophobically modified comb polymers described in U.S. Pat. Nos. 5,574,127 and 6,162,877 respectively. Another class of PAPE based associative thickeners that is also within the scope of the present invention includes alkylaryl glycidol ether modified PAPE (disclosed in non-provisional application Ser. No. 11/031,187, entitled "Colorant Compatible Synthetic Thickener For Paint", filed Jan. 7, 2005, for hydrophobically modified comb (or block) PAPE) (X-33487-45; X-33445-70). In addition, the dispersion can also include a mixture of the above PAPE based polymers and other commercially available associative thickeners, such as HEUR, HASE, HM-PEG and hydrophobically modified cellulose ethers.

The composition of the present invention has a poly(acetal- or ketal-polyether) (PAPE) backbone that is either linear or branched, with the linear one being preferred. The polyethers (as precursors for the final polymer) that can be used in this invention include any water soluble polyalkylene oxide or copolymers of polyalkylene oxides; the preferred polyether backbone is polyethylene oxide or water soluble copolymers of ethylene oxide with another co-monomer such as propylene oxide and butylene oxide.

In accordance with the present invention, the aqueous dispersion of the HM-PAPE is a hydrophobically end-capped poly(acetal- or ketal-polyether). The HM-PAPE has terminal hydrophobes and may also have pendant hydrophobes therein. The hydrophobes can be an alkyl moiety having 3 to 30 carbon atoms or an alkylaryl moiety such as methylphenyl group. The hydrophobe can be linear or branched. The pendant hydrophobes may hang down from the backbone in a uniform pattern, a random pattern, or in bunches.

The weight average molecular weight of the HM-PAPE polymer has an upper limit of 100,000, preferably 50,000, and more preferably 40,000. The lower limit of the molecular weight of the polymer is 3,000, preferably 4,000, and more preferably 8,000.

For a more detailed description of these associative polymers and processes of making them, for HM-PAPE, see U.S. Pat. No. 5,574,127 and U.S. Pat. No. 6,162,877, and non-provisional patent application Ser. No. 11/031,187, entitled "Colorant Compatible Synthetic Thickener For Paint", filed Jan. 7, 2005, for hydrophobically modified comb (or block) PAPE, wherein the subject matter of both patents and patent application is incorporated herein by reference. The subject matter of all three of these patents and patent application will be referred to herein as "HM-PAPE".

Viscosity Reducing Agent

In accordance with the present invention, typical viscosity reducing agents include nonionic and anionic surfactants. Nonionic surfactants include alcohol ethoxylates ($C_{10}$-$(EO)_6$—Iconol DA-6 (EO=ethylene oxide unit), Ethal DA-6 and Huntsman DA-6; $C_{10}$-$(EO)_9$—Ethal DA-9; $C_{9-11}$-$(EO)_6$—Rhodasurf 91-6), ethoxylated 2,4,7,9-tetramethyl-5-decyn-4,7-diol or Surfynol 465 (Air Products); $C_6$ alkylglucoside (AG 6206, Akzo-Nobel); $C_8$ alkylglucoside (AG 6202, Akzo-Nobel); $C_8$-$C_{10}$ alkylglucoside (AG 6210, Akzo-Nobel); $C_{10}$-alcohol ethoxylate PEG (7EO), Biodac 710 (Sasol); $C_{10}$-alcohol ethoxylate PEG (8EO), Biodac 810 (Sasol); Primary alcohol ethoxylate, $C_9$-$C_{12}$, PEO(6), Synperonic 91/6 (ICI); decyl glucoside, Plantacare 200 UP (Henkel).

Typical anionic surfactants include dialkyl sulfosuccinates (diamyl sulfosuccinate—Aerosol AY-100; diisobutyl sulfosuccinate—Aerosol IB-45; dioctyl sulfosuccinate—Aerosol OT); dihexylsulfosuccinate, Disponil SUS IC 680, Henkel; phosphate ester—Strodex LFK-70. The less volatile solvent of interest includes Ecosoft PB or EPB (10.5 wt % VOC) product, that is tetraethylene glycol monobutyl ether, manufactured by Dow Chemical company, other less volatile solvents include butyl triglycol (53 wt % VOC) (DOW). The standard high VOC solvent that is used in the industry is butyl carbitol (BC) which has 100 wt % VOC. The VOC content of solvents are calculated according to EPA-24 test.

In the present invention, the viscosity reducing agent has an upper limit of 20 wt %, preferably 10 wt %. The lower limit can be as low as 0.5 wt %, preferably 1.0 wt %, and more preferably 3.0 wt %. It should also be noted that certain solvents can also be used as viscosity reducing agents.

Water Content

In accordance with the present invention, water can be present having an upper limit of 85 wt %, preferably 75 wt %, and more preferably 65 wt %. The lower limit of the amount of water in the dispersion is 30 wt %, preferably 40 wt %, and more preferably 50 wt %. It should be understood that water is relative to the other ingredients in the dispersions and can vary somewhat depending on the various other ingredients present.

Aqueous Protective Coatings

In accordance with the present invention, HMPAPE or HM comb or block PAPE compositions can be used in film forming coating compositions such as water-borne coatings (i.e., lacquers, latex paints, etc.). In the latex paint, the pigment, for example, can be hydrated aluminum oxide, barium sulfate, calcium silicate, clay, silica, talc, titanium dioxide, or zinc oxide. The pigment is determined by the desired results and the manufacturer. Generally, the ratio of the volume of pigment to the volume of total non-volatile material present in paint is referred to as the pigment volume concentration (PVC) which is normally expressed in percent. Latex paints have a PVC upper limit of 85, preferably 75, and more preferably 65. These latex paints have a PVC lower limit of 10 and preferably 20. More particularly, when the latex paint is high gloss paint, the PVC is from about 15 to about 30; when the paint is a semi-gloss paint, the PVC is from about 20 to about 35; and when it is a flat paint, the PVC is from about 40 to about 85. Also, for latex paints, the ICI viscosity should be above about 1.0, preferable above 1.5 Pa·s at 25° C. for good performance.

The improved method of incorporating aqueous dispersions of HM-PAPEs of the present invention into protective coating formulations is to simply add the polymer dispersion to the coating formulation under agitation. It was surprising to find that the HM-PAPE polymer dissolution time was significantly reduced relative to the dissolution time of HM-PAPE in water alone, when it was delivered as an aqueous dispersion at ambient temperatures. Hence, the use of the aqueous dispersion of the present invention makes it easier and faster for incorporating the thickeners into paint formulations. It was found that the use of the aqueous dispersion of the present invention reduced the polymer dissolution time by about 30%, and in some instances even up to about 50%, as compared to the time needed when an aqueous solution of HM-PAPE was used to thicken the coating formulation.

In accordance with the present invention, the incorporation of the HM-PAPE polymers into paint formulations using the dispersions of this invention achieves several advantages. 1) Lowering the active content from 25% to 17.5% of HM-PAPE in water/BTG (BTG=Butyl triglycol)/HM-PAPE dispersions of the present invention decreased dissolution time of the thickener in paint by 50%, when applied in a high gloss paint formulation. When applying the same dispersion in a flat paint formulation, dissolution time was reduced by 30%. 2) A further improvement in decreasing dissolution time by another 60% is obtained by using a dispersion of BTG and a surfactant (for example Surfynol® 465 product) as viscosity reducing agent. Again, in a high gloss paint formulation, the addition of Surfynol 465 surfactant to existing commercial Aquaflow NLS series polymers improves significantly the ease of incorporation. Addition of 1% Surfynol 465 surfactant reduces complete dissolution time of Aquaflow NLS 210 polymer in high gloss paint by 40%. Also, in a latex paint having a PVC of 70, the complete dissolution time of Aquaflow NLS 210 polymer is reduced by 35% upon addition of 1 wt % of Surfynol 465 surfactant to Aquaflow NLS 210 polymer dispersion.

Other ingredients that are commonly found in paints are binders (e.g., 100% acrylics, vinyl-acrylics, and styrene-acrylics), dispersants (e.g., polyphosphates, amino alcohols, and acrylic copolymers), defoamers (e.g., non-silicone and silicone types), wet-edge agents (e.g., ethylene glycol, propylene glycol, and hexylene glycol), preservatives (e.g., non-mercurial type) coalescing agents (e.g., glycol ethers/esters and surface-active agents), biocides, humectants, pH modifiers, and colorants.

For a more detailed understanding of the invention, reference can be made to the following examples which are intended as further illustration of the invention and are not to be construed in a limiting sense. All parts and percentages are by weight unless stated otherwise.

EXAMPLES

Standard Procedures

A. The following procedure was used to make aqueous dispersions of polymers in the studied carrier solvents (FIG. 1-3 and Table 1-2 below):

1. Solid polymer, water, and surfactant/solvent were combined in a vessel and heated at 70-75° C. for 1-2 hours until the mixture melted.
2. The hot melt/dispersion was shaken for 1 min and placed on a rotating wheel at room temperature for 2-3 hours.
3. If a sample was not completely dissolved after 2-3 hours, the sample was mixed by hand with a spatula and then steps 1 and 2 were repeated. 2-3 drops of glacial acetic acid were added to the dispersion to bring the pH to ~7.1.
4. The rheology of the dispersed polymer was measured as described in the foot note of Table 1.

B. A second method used to prepare samples used in Examples 23 to 27 was to ground the experimental HM-PAPE prior to dissolution with a Retch-sieve fitted with a 0.5 mesh screen. The powder was sieved through a screen size number 30 and particles larger than number 30 screen size that were contained on the screen were discarded. Solutions were prepared by weighing the ingredients and mixing overnight using an anchor shaped stirrer. In the case of using commercially available HM-PAPEs (i.e., Aquaflow NLS 200 and Aquaflow NLS 210 products) the additives were weighed and stirring was done with an anchor shaped stirrer at the highest speed for 15 minutes. The samples were allowed to equilibrate in a water bath at 25° C. after preparation.

The Brookfield viscosities of the aqueous dispersions of the invention that were made up using the above mentioned procedure B were measured and were recorded in the graphs or Tables as noted below.

Preparation of HM-Block (or Comb)-PAPE Polymers:

X33487-45 (PAPE, 8.6% of glycidyl 2-methyl phenyl ether). A mixture of polyethylene glycol (molecular weight ~8000) (600 g) and sodium hydroxide pellets (12 g) was heated at 80° C. for 1 hr. Dibromomethane (8.8 g) was added and the resulting reaction mixture was stirred for 1 hr. Glycidyl 2-methyl phenyl ether (87 g) was added and the reaction temperature was kept at 120° C. for 4 hrs. The product was collected after the reaction was cooled to room temperature. SEC analysis showed that the product is a polymer with a number average molecular weight (Mn) of 21,000. $^1$H NMR analysis gave the amount of hydrophobe incorporated of 8.6% by weight.

X33445-70 (PAPE, 10.8% of glycidyl 2-methyl phenyl ether) Similarly, using the process for X33487-45, the sample X33445-70 was prepared with 600 g of 8,000 Mn PEG, 12 g of NaOH, 6.2 g of dibromo-methane and 107 g of glycidyl 2-methyl phenyl ether. The product has a molecular weight (Mn) of 12,600, and a hydrophobe content of 10.8% by weight.

HM-PAPE polymers (NLS-200 and NHS-300) are commercial products marketed by Hercules Incorporated under the trademarks Aquaflow NLS-200 and Aquaflow NHS-300.

Preparation of n-Butyl—(EO)$_{7.6}$-Me New Molecule 100 grams of Carbowax 350 product (Me-(EO)$_{7.5}$), was heated with 15 grams of NaOH for 1 hour at 80° C. Then, 50 grams (0.36 mol) of butyl bromide was added to the mixture and was kept at 80° C. for 2 hours, then at 100° degree C. for 4 hours. After cooling, the mixture was filtered twice to remove salt. A total amount of 130 grams of product was collected, designated further as X-33564-8A.

Typical surfactants used in the Examples include alcohol ethoxylates (C$_{10}$-(EO)$_6$—Iconol DA-6, Ethal DA-6 and Huntsman DA-6; C$_{10}$-(EO)$_9$—Ethal DA-9; C$_{9-11}$-(EO)$_6$—Rhodasurf 91-6), dialkyl sulfosuccinates (diamyl sulfosuccinate—Aerosol AY-100; diisobutyl sulfosuccinate—Aerosol IB-45; dioctyl sulfosuccinate—Aerosol OT), ethoxylated 2,4,7,9-tetramethyl-5-decyn-4,7-diol or Surfynol 465, phosphate ester—Strodex LFK-70. The low VOC solvent of interest includes Ecosoft PB or EPB product (tetraethylene glycol monobutyl ether), marketed by the Dow Chemical company.

Examples 1 to 22

Figure 1:
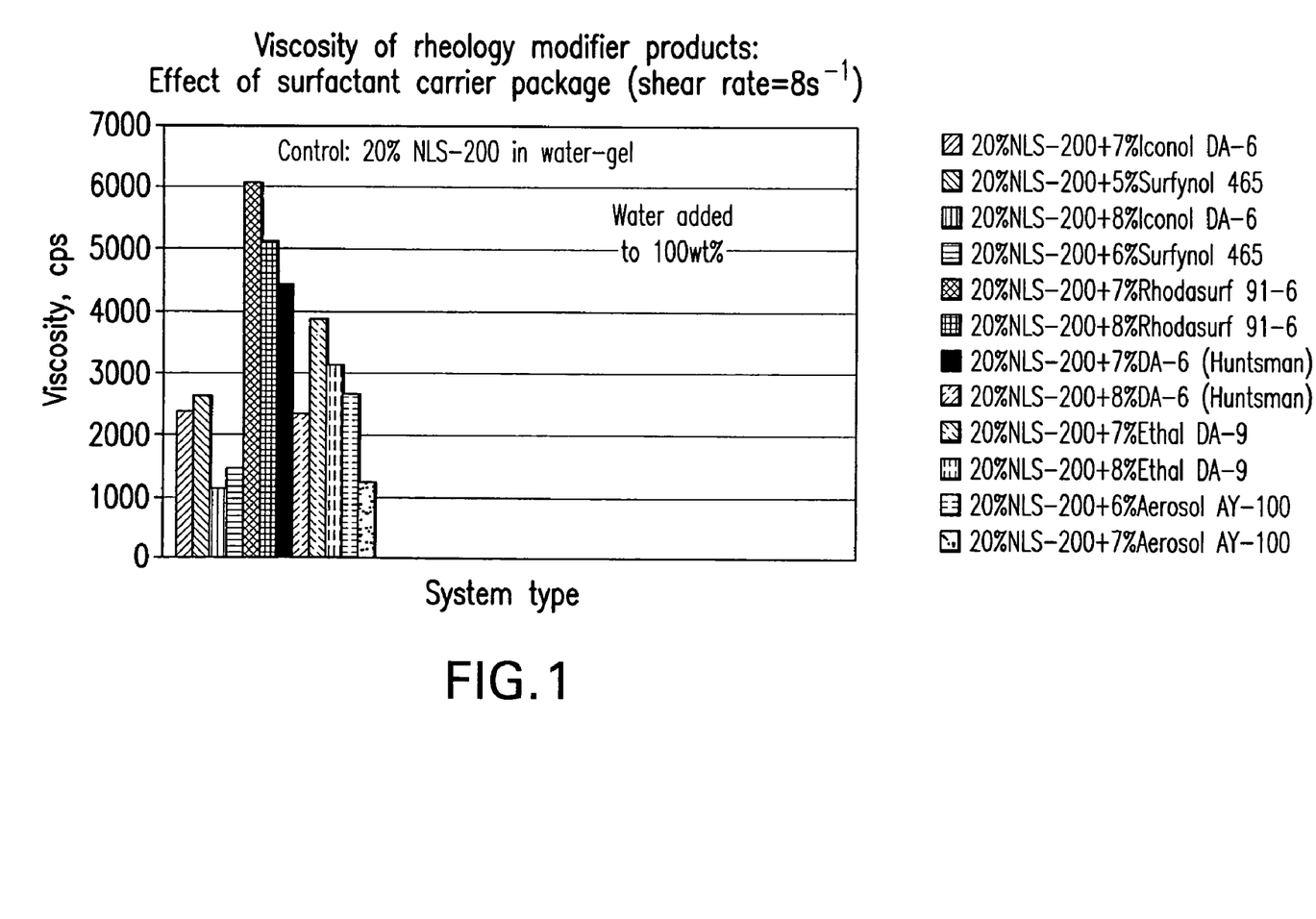
FIG. 1 shows a bar graph of viscosities of mixtures of dispersions of the present invention.
Figure 2:
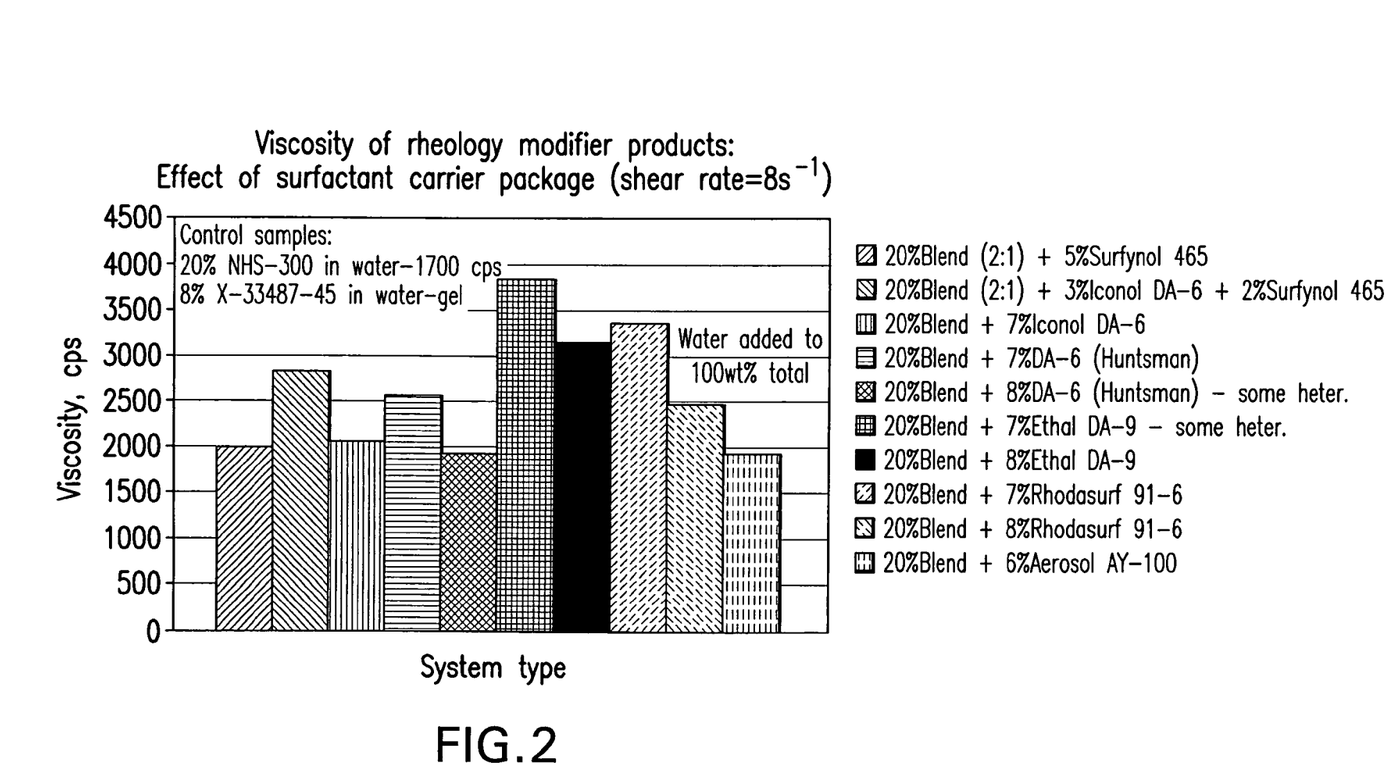
FIG. 2 shows a bar graph of viscosities of blends of dispersions of the present inventions.

The A standard procedure was used to prepare the test samples for these Examples and were reported in FIGS. 1 to 2 and Tables 1 and 2.

FIG. 1 and 2 below show viscosity of various mixtures that are part of this invention. Either 20% NLS-200 (C$_{16}$PAPE), FIG. 1, or 20% 2:1 wt/wt blend based on NHS-300 (C$_{12}$-PAPE)/X-33487-45 (see below) was used in these Examples.

In FIG. 1, 20% NLS-200 active mixture in water resulted in gel/paste formation. The use of the chosen surfactants as additives at only (5-8) wt % level allowed reducing 20% NLS-200 dispersion viscosity down to 1,000-6,000 cps level.

In FIG. 2, 20% 2:1 wt/wt blend based on NHS-300 (C$_{12}$-PAPE)/X-33487-45 produced a gel/paste in water. The use of the chosen surfactants as additives at only 5-8 wt % level allowed reducing 20% blend dispersion viscosity down to 2,000-4,000 cps level.

Figure 3:
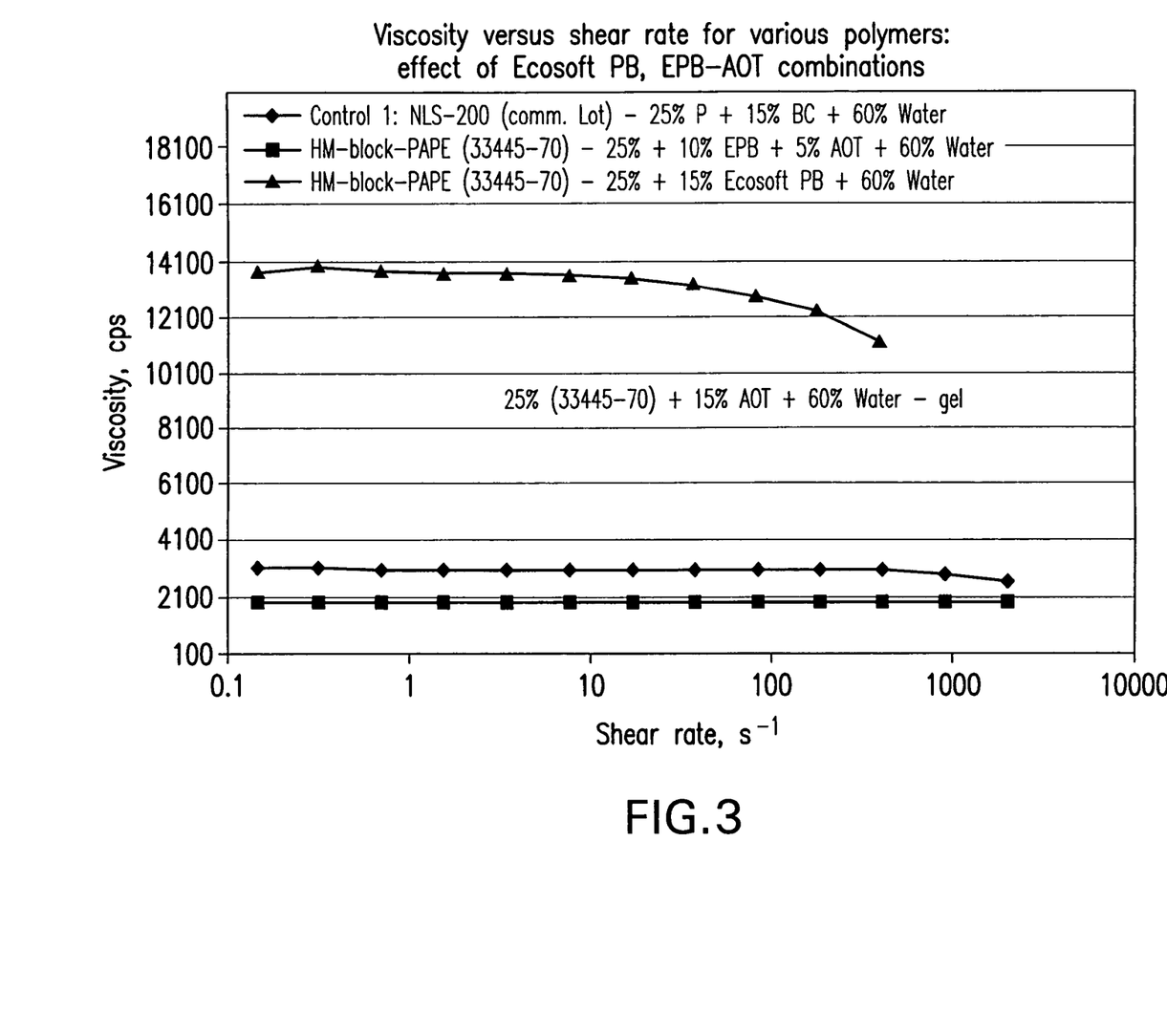
FIG. 3 shows a line graph of viscosities versus shear rates for polymer and surfactant combinations.

FIG. 3 below shows viscosity of NLS-200 (solid-C$_{16}$-PAPE) in water-butyl carbitol mixture as the control as well as HM-block-PAPE (X-33445-70) polymer in water-Ecosoft PB, water—Ecosoft PB—Aerosol OT and water-AOT mixtures as part of this invention.

A mixture of 25% active HM-block-PAPE in water with 15% added AOT surfactant resulted in gel formation. The mixture of 25% active HM-block-PAPE in water with 15% added EPB solvent produced a high viscosity, in the range of 14,000-10,000 cps depending on shear rate.

However, quite unexpectedly, the mixture of 25% active HM-block-PAPE in water with 10% added EPB (low VOC) solvent and 5% added AOT surfactant produced a very low 2000 cps viscosity. The solution viscosity was even lower than the viscosity of a commercial NLS-200 product made with the addition of 15% of high volatile organic solvent, butyl carbitol (see FIG. 3).

Thus, a synergy in viscosity reduction of HM-block-PAPE was observed for a combination of Ecosoft PB (tetraethylene glycol mono butyl ether) and Aerosol OT (AOT).

Table 1 below shows viscosity data for 2:1 wt/wt blend based on NHS-300 (C$_{12}$-PAPE) X-33487-45 (see below) in the mixture with a single surfactant or a blend of surfactants as part of this invention.

In the cases of all three nonionic surfactants used as the additives to reduce blend viscosity, additional benefits were observed in combining this surfactant with AOT surfactant. The viscosity of the blend in combination of surfactant/additive-AOT was lower than for each individual component, i.e., AOT or additive used alone at the same concentration as total (AOT+additive) concentration.

Thus, a synergy in viscosity reduction of the blend is observed for a combination of nonionic alcohol ethoxylated surfactants and Aerosol OT.

Table 2 below shows viscosity data for 20% NLS-200 (C$_{16}$-PAPE; commercial lot# F-05178-AT 02, see below) in low EPB—Water solvent mixture, in Strodex LFK-70—Water mixture, in EPB—Strodex LFK-70—Water, in EPB—Iconol DA-6—Water mixtures as well as for 20% NHS-300 just in Water and in Strodex LFK-70—Water mixture.

The control sample—20% HM-PAPE (NLS-200) did not dissolve in water and forms a paste/gel.

The addition of either surfactants alone (nonionic alcohol ethoxylate—Iconol DA-6 or anionic phosphate ester Strodex LFK-70) or their combination with low VOC solvent—EPB allowed to disperse and dramatically decrease viscosity of the final mixture resulting in the formation of polymer concentrate with the viscosity in the range of 1,000-3,000 cps.

The above given additional Examples further illustrate efficiency of the chosen surfactants and selected surfactant-EPB combinations for suppressing viscosity of the HM-PAPE rheology modifiers.

Polymer Characteristics Are:

NLS-200 (solid-C$_{16}$-PAPE: synthesis described in U.S. Pat. No. 6,809,132 B2; Oct. 26, 2004)—Mn=18,000; Mw=33,000; lot# F-04063-B; Mn=18.7K; Mw=33,800; lot# F-05178-AT 02—both slightly lower Mw than regular batch.

NHS-300 (solid-C$_{12}$-PAPE: synthesis described in U.S. Pat. No. 6,809,132 B2; Oct. 26, 2004)—Mn=15,400; Mw=27,000—lower Mw; lot # F-04061-A; and Mw=35,000-38,000; lot # P-01016A 02.

HM-block-PAPE X-33487-45: Mn=21,100; Mw=38,000—regular Mw; MePhGly ether—"blocky" hydrophobe: 8.2 wt % or 5.3 moles per —OH mole;

HM-block-PAPE 33445-70: MePhGly ether—"blocky" hydrophobe: 10.8 wt % or 4.1 moles per —OH mole; Mn=12,600; Mw=18,400—lower Mw.

Solvents and surfactants in the Examples were marketed by Dow (Ecosoft PB), Cytec Co. (Aerosol OT—75% active and Aerosol AY-100), BASF (Iconol DA-6; Plurafac B-26), Huntsman (DA-6), Air Products (Surfynol 465), Ethox Co. (Ethal DA-9), Rhodia Co. (Rhodasurf 91-6 and Rhodasurf LA-12), Dexter Chemical Company (Strodex LFK-70; 70% active) as well as synthesized in-house (new molecule).

TABLE 1

Surfactant-surfactant efficacy: additional examples

| Major Surfactant | Chemistry | MM | HLB | CP (1%) or solubility | 2:1 Blend viscosity*, cps |
|---|---|---|---|---|---|
| Plurafac B-26<br>1) 15%-as is<br>2) 10% + 5% AOT | $C_{12}$-$C_{15}$-$(EO)_x$—$(PO)_y$—H | 1030-av | 14 | CP = 72-77 C. >10% at 25 C. | 1) Visc., inhomog.<br>2) 5220 cps |
| RhodasurfLA-12<br>1) 15%-as is<br>2) 10% + 5% AOT | $CH_3(CH_2)_{10}$-$(EO)_{12}CH_2OH$ | 714 | 14.4 | CP = 90-100 C. | 1) 12300 cps<br>2) 5803 cps |
| New molecule<br>1) 15%-as is<br>2) 10% + 5% AOT | $C_4H_9O$-$(EO)_{7.5}$—$CH_3$ | 418-av | N/A | CP- N/A | 1) 7810 cps<br>2) 4620 cps |

*2:1 Blend = NHS-300:HM-b-PAPE(−45) at 25 wt % in Water(60%)-Surfactant(10%)-AOT(5%); Viscosity for surfactant-surfactant additive are given at 85 s$^{-1}$; 7400 cps-15% AOT control
Where CP stands for cloud point.

Controlled stress rheometer AR-1000 in shear sweep mode was used with cone and plate geometry at 25° C. to generate viscosity profiles (FIG. 1-3, Table 1-2). Viscosities are given at about 8-10 s$^{-1}$ (FIG. 1-2 and Table 1-2).

TABLE 2

Surfactant and surfactant- low VOC solvent efficacy: additional examples.

| Polymer | Surfactant/solvent | Viscosity (10 s$^{-1}$), cps |
|---|---|---|
| 20% NLS-200 | 80% Water | Not soluble |
| 20% NLS-200 | 19% EPB + 61% Water | 3K |
| Same as above | 10% Strodex LFK-70 + 70% Water | 2.3K |
| Same as above | 10% EPB + 9% Strodex LFK-70 + 61% Water | 1.6K |
| Same as above | 10% EPB + 9% Iconol DA-6 + 61% Water | 1.2K |
| 20% NHS-300 | 80% Water | 4.6K |
| 20% NHS-300 | 12% Strodex LFK-70 + 68% Water | 2.3K |

Note:
Here Strodex LFK-70 concentration was expressed per product as is, i.e. w/o correction for 70% activity.

The dissolution rate can be monitored via the thickening efficiency and the time it took to achieve the right viscosity having a smooth appearance in paint (no lumps).

The standard procedure B was used to prepare and evaluate the test samples for Examples 23 to 27, below.

Example 23

Ease of Incorporation of HMPAPE "NLS 200" Mixtures in HG 5 High Gloss Paint Compared to Commercial Aquaflow NLS 200

| Thickener | Composition (wt %) | TE (wt %) | Time required to start dissolution (minutes) | Time required for complete dissolution (minutes) | Rating ease of incorporation |
|---|---|---|---|---|---|
| Commercial NLS 200 | HMPAPE/water/BC (25/60/15) | 0.10 | 5 | 10 | Moderate |
| TK 36 | HMPAPE/water/BTG (25/55/20) | 0.12 | 11 | 20 | Difficult |
| TK 34 | HMPAPE/water/Surfynol 465 (19.5/72.2/8.3) | 0.13 | 1 | 2 | Easy |
| TK 52 | HMPAPE/water/BTG (21/63/16) | 0.12 | 2 | 10 | Moderate |
| TK 54 Invention | HMPAPE/water/BTG (17.5/66.5/16) | 0.14 | 2 | 5 | Easy |
| TK 57 Invention | HMPAPE/water/BTG/Surfynol 465 (17.5/66.5/13.5/2.5) | 0.10 | 1 | 2 | Easy |
| TK 58 Invention | HMPAPE/water/BTG/Surfynol 465 (17.5/66.5/11/5) | 0.10 | 1 | 2 | Easy |

The improvement in ease of incorporation is thus seen via samples TK 57 and TK 58 which show that the present invention dispersion gives the same thickenings efficiency as commercial NLS 200, but require significant less time to dissolve in paint mix.

There is an effect of active content of the thickener, when comparing TK 52 to TK 54, the ease of incorporation is easier when using a lesser amount of HMPAPE in the mixture.

But even a further improvement is possible when using a mixture of BTG/Surfynol 465 instead of BTG as a single viscosity reducing agent as demonstrated in example 23; compare TK 54 to TK 57 and TK 58.

Example 24

Ease of Incorporation of HMPAPE "NLS 200" Mixtures in HG 5 High Gloss Paint Compared to Commercial Aquaflow NLS 200

| Thickener | Composition (wt %) | TE (wt %) | Time required to start dissolution (minutes) | Time required for complete dissolution (minutes) | Rating ease of incorporation |
|---|---|---|---|---|---|
| Commercial NLS 200 | HMPAPE/water/BC (25/60/15) | 0.10 | 5 | 10 | Moderate |
| TK 63 Invention | HMPAPE/water/BTG/Surfynol 465 (20.2/60.6/16.2/3) | 0.10 | 1.5 | 3.5 | Easy |
| TK 64 Invention | HMPAPE/water/BTG/Surfynol 465 (20.2/60.6/13.2/6) | 0.10 | 1.5 | 3 | Easy |
| TK 52 | HMPAPE/water/BTG (21/63/16) | 0.12 | 2 | 10 | Moderate |

Example 25

Ease of Incorporation of HMPAPE "NLS 210" Mixtures in HG 5 High Gloss Paint Compared to Commercial Aquaflow NLS 210

| Thickener | Composition (wt %) | TE (wt %) | Time required to start dissolution (minutes) | Time required for complete dissolution (minutes) | Rating ease of incorporation |
|---|---|---|---|---|---|
| Commercial NLS 210 | HMPAPE/water/BC (25/56.2/18.8) | 0.07 | 7 | 10 | Moderate |
| TK 39 | HMPAPE/water/BTG (20.7/62.3/17) | 0.09 | 13 | >20 | Difficult |
| TK 43 | HMPAPE/water/BC (25/56.2/18.8) | 0.08 | 5 | 10 | Moderate |
| TK 55 | HMPAPE/water/BTG (17.5/66.5/16) | 0.08 | 7 | 15 | Moderate |
| TK 62 Invention | HMPAPE/water/BTG/Surfynol 465 (17.5/66.5/11/5) | 0.15 | 1 | 2 | Easy |
| TK 65 Invention | HMPAPE/water/BTG/Surfynol 465 (20.2/60.6/13.2/6) | 0.09 | 3 | 4.5 | Easy |
|  | NLS 210 (same lot as beneath) | 0.07 | 8 | 15 | Moderate |
|  | NLS 210 + 0.5 wt % Surfynol 465 | 0.07 | 10 | 18 | Difficult |
| Duplicate | NLS 210 + 0.5 wt % Surfynol 465 | 0.07 | 10 | 16 | Difficult |
|  | NLS 210 + 1 wt % Surfynol 465 | 0.07 | 6.5 | 9 | Moderate |
|  | NLS 210 + 2.5 wt % Surfynol 465 | 0.06 | 6.5 | 9 | Moderate |
|  | NLS 210 + 5 wt % Surfynol 465 | 0.06 | 5 | 8 | Moderate |

The invention is also applicable to a HMPAPE carrying a longer alkyl chain than then HMPAPE in Aquaflow NLS 200 as is shown in Example 25. Again, the thickeners were evaluated in a high gloss paint, having a styrene/acrylic binder. The ease of incorporation is significantly improved when using a mixture of Surfynol 465 and BTG as viscosity reducing agents (compare TK 55 to TK 62).

The invention is also applicable to Commercial NLS types: addition of 1 wt % Surfynol 465 to Aquaflow NLS 210 decreases the complete dissolution time of the thickener by 40%.

TABLE 3

Formulation of a high gloss paint (HG5)

| Ingredient | Parts by weight |
| --- | --- |
| Water | 24.0 |
| Dispex GA 40 | 12.0 |
| Preventol D7 | 2.0 |
| Dehydran 1293 | 2.0 |
| Propylene glycol | 20.0 |
| AMP 90 | 0.2 |
| Tioxide R-HD2 | 207.9 |
| 15 minutes/4000 rpm | |
| Primal HG 74 D | 561.2 |
| Dehydran 1293 | 1.0 |
| Dowanol DPnB | 22.5 |
| Propylene glycol | 10.0 |
| H₂O/polymer | 137.2 |
| Total | 1000 |

| RAW MATERIAL | FUNCTION | CHEMICAL DESCRIPTION | SUPPLIERS: |
| --- | --- | --- | --- |
| Dispex GA 40 | Dispersant | Acrylic copolymer, ammonium salt | Ciba Specialty Chemicals |
| Preventol D7 | Preservative | Aqueous, formaldehyde-free formulation of various isothiazolinones | Bayer |
| Dehydran 1293 | Defoamer | 10% solution of modified polydimethyl siloxane | Cognis |
| Propylene glycol | Co-solvent | Propyleneglycol | — |
| AMP 90 | pH stabilizer/dispersant | Aminopropanol | Angus Chemie |
| Tioxide R-HD2 | Pigment | Titanium dioxide | Huntsman |
| Primal HG 74 D | Binder | Modified acrylic latex (42%) | Rohm and Haas |
| Dowanol DPnB | Coalescing agent | Dipropyleneglycol-buthylether | Dow Chemical |

This invention is also applicable for flat paint formulations. This is rather unexpected since the interaction of associative thickener is flat paints is quite different from that in gloss paint.

Example 26

Ease of Incorporation of HMPAPE "NLS 200" Mixtures in PVC 70 SF/Mowilith LDM 1871 Paint

| Thickener | Composition (wt %) | TE (wt %) | Time required to start dissolution (minutes) | Time required for complete dissolution (minutes) | Rating ease of incorporation |
| --- | --- | --- | --- | --- | --- |
| Commercial NLS 200 | HMPAPE/water/BC (25/60/15) | 0.43 | 4 | 8 | Moderate |
| TK 52 | HMPAPE/water/BTG (21/63/16) | 0.50 | 1 | 5 | Easy |
| TK 54 Invention | HMPAPE/water/BTG (17.5/66.5/16) | 0.53 | 1 | 5 | Easy |
| TK 57 Invention | HMPAPE/water/BTG/Surfynol 465 (17.5/66.5/13.5/2.5) | 0.38 | 1 | 3 | Easy |
| TK 58 Invention | HMPAPE/water/BTG/Surfynol 465 (17.5/66.5/11/5) | 0.37 | 1 | 3 | Easy |
| TK 63 Invention | HMPAPE/water/BTG/Surfynol 465 (20.2/60.6/16.2/3) | 0.40 | 1 | 5 | Easy |
| TK 64 Invention | HMPAPE/water/BTG/Surfynol 465 (20.2/60.6/13.2/6) | 0.39 | 1 | 3 | Easy |

Example 27

Ease of Incorporation of HMPAPE "NLS 210" Mixtures in PVC 70 SF/Mowilith LDM 1871 Paint

| Thickener | Composition (wt %) | TE (wt %) | Time required to start dissolution (minutes) | Time required for complete dissolution (minutes) | Rating ease of incorporation |
|---|---|---|---|---|---|
| Commercial NLS 210 | HMPAPE/water/BC (25/60/15) | 0.27 | 10 | 20 | Difficult |
| TK 53 | HMPAPE/water/BTG (20.7/62.3/17) | 0.32 | 2 | 9 | Moderate |
| TK 55 Invention | HMPAPE/water/BTG (17.5/66.5/16) | 0.33 | 1 | 4 | Easy |
| TK 62 Invention | HMPAPE/water/BTG/Surfynol 465 (17.5/66.5/13.5/2.5) | 0.50 | 1 | 2 | Easy |
| TK 65 Invention | HMPAPE/water/BTG/Surfynol 465 (20.2/60.6/13.2/6) | 0.36 | 1 | 4.5 | Easy |
| | NLS 210 (same lot as beneath) | 0.24 | 5 | >20 | Difficult |
| | NLS 210 + 0.5 wt % Surfynol 465 | 0.24 | 4 | 18 | Difficult |
| | NLS 210 + 1 wt % Surfynol 465 | 0.24 | 3 | 13 | Moderate |
| | NLS 210 + 2.5 wt % Surfynol 465 | 0.24 | 2 | 8 | Moderate |
| | NLS 210 + 5 wt % Surfynol 465 | 0.24 | 1.5 | 4.5 | Easy |

TABLE 4

Paint formulation PVC 70 Solvent free Mowilith LDM 1871 paint

| Ingredients | Parts by weight |
|---|---|
| Water | 155.0 |
| Calgon N | 3.0 |
| Lopon 894 | 3.0 |
| Agitan 315 | 3.0 |
| Tioxide TR-92 | 100.0 |
| China-Clay Speswhite | 50.0 |
| Polestar 200 P | 50.0 |
| Omyacarb 2 GU | 264.0 |
| Micro Talc WT 1 | 47.0 |
| Agitan 315 | 1.0 |
| Preventol D 7 | 2.0 |
| Mowilith LDM 1871 | 158.0 |
| H$_2$O/Polymer | 164.0 |
| Total | 1000 |

| RAW MATERIAL | FUNCTION | CHEMICAL DESCRIPTION | SUPPLIERS |
|---|---|---|---|
| Calgon N | Wetting agent | Sodiumpolyphosphate | BK Giulini Chemie |
| Lopon 894 | Dispersing agent | Polyacrylate, Sodium salt | BK Giulini Chemie |
| Agitan 315 | Defoamer | Modified fatty compounds | Münzing Chemie |
| Tioxide TR-92 | Pigment | Titaniumdioxide | Huntsman |
| China-Clay Speswhite | Extender | Clay | Imerys |
| Polestar 200 P | Extender | Clay, calcined | Imerys |
| Omyacarb 2 GU | Extender | CaCO$_3$, mean particle size: 2.5 micron | Omya |
| Micro Talc WT 1 | Extender | Talcum | Norwegian Talc |
| Preventol D7 | Preservartive | Aqueous, formaldehyde-free formulation of | Bayer |
| Mowilith LDM 1871 | Binder | Vinylacetate-Ethylene | Clariant |

While the invention has been described with respect to specific embodiments, it should be understood that the invention should not be limited thereto and that many variations and modifications are possible without departing from the spirit and scope of the invention.

What is claimed:

1. An aqueous polymer dispersion comprising
   a) hydrophobically modified poly(acetal- or ketal-polyether) (HM-PAPE),
   b) water, and
   c) a viscosity reducing agent selected from the group consisting of
      i) an ethoxylated alcohol having a $C_{9-12}$ hydrocarbon moiety component,
      ii) an ethoxylated acetylenic diol,
      iii) a phosphate ester,
      iv) a combination of an ethoxylated alcohol and an anionic dialkyl sulfosuccinate, and
      v) a combination of ethoxytated alcohol and an anionic phosphate ester.

2. The aqueous dispersion of claim 1 wherein the HM-PAPE has a weight average molecular weight (Mw) upper limit of 100,000.

3. The aqueous dispersion of claim 1, wherein the HM-PAPE has a weight average molecular weight (Mw) upper limit of 50,000.

4. The aqueous dispersion of claim 1, wherein the HM-PAPE has a weight average molecular weight (Mw) upper limit of 40,000.

5. The aqueous dispersion of claim 1, wherein the HM-PAPE has a weight average molecular weight (Mw) lower limit of 3,000.

6. The aqueous dispersion of claim 1, wherein the HM-PAPE has a weight average molecular weight (Mw) lower limit of 4,000.

7. The aqueous dispersion of claim 1, wherein the HM-PAPE has a weight average molecular weight (Mw) lower limit of 8,000.

8. The aqueous dispersion of claim 1, wherein the HM-PAPE is a hydrophobically end-capped poly(acetal- or ketal-polyether).

9. The aqueous dispersion of claim 1, wherein the HM-PAPE is a hydrophobically end-capped poly(acetal- or ketal-polyether) that has end-caps as well as pendant hydrophobes therein.

10. The aqueous dispersion of claim 1, wherein the HM-PAPE is a hydrophobically modified poly(acetal- or ketal-polyether) that has $C_3$-$C_{30}$ alkyl hydrophobes therein.

11. The aqueous dispersion of claim 1, wherein the HM-PAPE is a hydrophobically end-capped poly(acetal- or ketal-polyether) that has $C_{12}C_{18}$alkyl hydrophobes therein.

12. The aqueous dispersion of claim 1, wherein the HM-PAPE is a hydrophobically end-capped poly(acetal- or ketal-polyether) that has alkylaryl hydrophobes therein.

13. The aqueous dispersion of claim 1, wherein the HM-PAPE is a hydrophobically end-capped poly(acetal- or ketal-polyother) that has methylphenyl hydrophobes in bunches therein.

14. The aqueous dispersion of claim 1, wherein the HM-PAPE is present in an upper limit amount 40 wt %.

15. The aqueous dispersion of claim 1, wherein the HM-PAPE is present in an upper limit amount of 30 wt %.

16. The aqueous dispersion of claim 1, wherein the HM-PAPE is present in an upper limit amount of 20 wt %.

17. The aqueous dispersion of claim 1, wherein the HM-PAPE is present in a lower limit amount of 10 wt %.

18. The aqueous dispersion of claim 1, wherein the HM-PAPE is present in a lower limit amount Of 15 wt %.

19. The aqueous dispersion of claim 1, wherein the viscosity reducing agent is present in an upper limit amount of 30 wt %.

20. The aqueous dispersion of claim 1, wherein the viscosity reducing agent is present in an upper limit amount of 20 wt %.

21. The aqueous dispersion of claim 1, wherein the viscosity reducing agent is present in an upper limit amount of 10 wt %.

22. The aqueous dispersion of claim 1, wherein the viscosity reducing agent is present in a lower limit amount of 0.5 wt %.

23. The aqueous dispersion of claim 1, wherein the viscosity reducing agent is present in a lower limit amount of 1.0 wt %.

24. The aqueous dispersion of claim 1 wherein the viscosity reducing agent is present in a lower limit amount of wt 3.0 wt%.

25. The aqueous dispersion of claim 1, wherein the water is present in an upper limit amount of 85 wt %.

26. The aqueous dispersion of claim 1, wherein the water is present in an upper limit amount of 75 wt %.

27. The aqueous dispersion of claim 1, wherein the water is present in an upper limit amount of 65 wt %.

28. The aqueous dispersion of claim 1, wherein the water is present in a lower limit amount of 30 wt %.

29. The aqueous dispersion of claim 1, wherein the water is present in a lower limit amount of 40 wt %.

30. The aqueous dispersion of claim 1, wherein the water is present in a lower limit amount of 50 wt %.

31. The aqueous dispersion of claim 1, wherein the viscosity reducing agent is ethoxylated 2,4,7,9-tetramethyl-5-decyn-4,7-diol (Surfynol®465 product).

32. The aqueous dispersion of claim 1, wherein the viscosity reducing agent is a phosphate ester (Strodex®LFK-70 product).

33. The aqueous dispersion of claim 1, wherein the viscosity reducing agent is alcohol ethoxylates ($C_{10}$-$(EO)_6$ (Iconol®DA-6 product).

34. The aqueous dispersion of claim 1, wherein the viscosity reducing agent is a combination of an ethoxylated alcohol and an anionic dialkyl sulfosuccinate and wherein the ethoxyleted alcohol is a tetraethylene glycol monobutyl ether.

35. The aqueous dispersion of claim 1, wherein the viscosity reducing agent is $C_{9-11}$-$(EO)_6$ (Rhodasurf® 91-6).

36. The aqueous dispersion of claim 1, wherein butyltriglycol is also Present.

37. An aqueous protective coating composition comprising the dispersion of claim 1.

38. The aqueous protective coating composition of claim 37, further comprising a latex.

39. The aqueous protective coating composition of claim 38, wherein the latex is selected from the group of 100% acrylics, vinyl-acrylics, and styrene-acrylics.

40. The aqueous protective coating composition of claim 38, wherein the aqueous protective coating further comprises a pigment.

41. The aqueous protective coating composition of claim 40, wherein the pigment is selected from the group consisting of hydrated aluminum oxide, barium sulfate, calcium silicate, clay, silica, talc, titanium dioxide, zinc oxide, and mixtures thereof.

42. The aqueous protective coating composition of claim 40, wherein the aqueous protective coating has a pigment volume concentration (PVC) upper limit of 85%.

43. The aqueous protective coating composition of claim 40, wherein the aqueous protective coating has a pigment volume concentration (PVC) upper limit of 75%.

44. The aqueous protective coating composition of claim 40, wherein the aqueous protective coating has a pigment volume concentration (PVC) upper limit of 65%.

45. The aqueous protective coating composition of claim 40, wherein the aqueous protective coating has a pigment volume concentration (PVC) lower limit of 10%

46. The aqueous protective coating of claim 40, wherein the aqueous protective coating has a pigment volume concentration (PVC) lower limit of 20%.

47. An improved method of incorporating HM-PAPE polymer into a protective coating formulation comprising adding the aqueous dispersion of claim 1 to the coating formulation while concurrently stirring the formulation, wherein the polymer dissolution time is significantly reduced as compared to the addition of HM-PAPE alone in water.

48. The improved method of claim 47, wherein the polymer dissolution time is reduced by 30%.

49. The improved method of claim 47, wherein the polymer dissolution time is reduced by 50%.

* * * * *